(12) United States Patent
Tang

(10) Patent No.: US 11,770,783 B2
(45) Date of Patent: *Sep. 26, 2023

(54) INFORMATION INDICATION METHOD AND DEVICE

(71) Applicant: GUANGDONG OPPO MOBILE TELECOMMUNICATIONS CORP., LTD., Guangdong (CN)

(72) Inventor: Hai Tang, Dongguan (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

This patent is subject to a terminal disclaimer.

(21) Appl. No.: 17/839,121

(22) Filed: Jun. 13, 2022

(65) Prior Publication Data

US 2022/0322258 A1    Oct. 6, 2022

Related U.S. Application Data

(63) Continuation of application No. 17/031,758, filed on Sep. 24, 2020, now Pat. No. 11,382,054, which is a (Continued)

(51) Int. Cl.
*H04W 56/00* (2009.01)
*H04W 48/16* (2009.01)
(Continued)

(52) U.S. Cl.
CPC ......... *H04W 56/001* (2013.01); *H04W 48/16* (2013.01); *H04W 72/0453* (2013.01); *H04W 72/20* (2023.01)

(58) Field of Classification Search
None
See application file for complete search history.

(56) References Cited

U.S. PATENT DOCUMENTS

2009/0258597 A1   10/2009   Chen et al.
2017/0318569 A1   11/2017   Dinan
(Continued)

FOREIGN PATENT DOCUMENTS

CN   106797611 A   5/2017
CN   107623933 A   1/2018
(Continued)

OTHER PUBLICATIONS

International Search Report in the international application No. PCT/CN2018/081468, dated Dec. 29, 2018.
(Continued)

*Primary Examiner* — Saba Tsegaye
(74) *Attorney, Agent, or Firm* — Ladas & Parry, LLP

(57) ABSTRACT

Provided are an information indication method and device. The method comprises operations as follows. A terminal device receives a synchronization signal block (SSB) transmitted by a network device. The terminal device acquires indication information according to frequency-domain position information of the SSB. The indication information is used to indicate an attribute of a carrier associated with the SSB, the attribute of the carrier comprises whether the carrier is used in a licensed carrier system or an unlicensed carrier system.

17 Claims, 5 Drawing Sheets

---

301 — The terminal device receives an SSB transmitted by the network device

302 — The terminal device acquires indication information according to frequency domain position information of the SSB, the indication information is used to indicate an attribute of a carrier associated with the SSB, and the attribute of the carrier includes whether the carrier is used by a licensed carrier system or an unlicensed carrier system

Related U.S. Application Data continuation of application No. PCT/CN2018/081468, filed on Mar. 30, 2018.

(51) Int. Cl.
*H04W 72/04* (2023.01)
*H04W 72/0453* (2023.01)
*H04W 72/20* (2023.01)

(56) References Cited

U.S. PATENT DOCUMENTS

| | | | |
|---|---|---|---|
| 2017/0331577 A1* | 11/2017 | Parkvall | H04W 4/00 |
| 2019/0029047 A1 | 1/2019 | Zhu et al. | |
| 2020/0204325 A1 | 6/2020 | Liu et al. | |
| 2020/0205095 A1 | 6/2020 | Astrom et al. | |
| 2020/0404617 A1* | 12/2020 | Murray | H04W 68/02 |
| 2021/0007108 A1 | 1/2021 | Tang | |
| 2021/0014805 A1 | 1/2021 | Tang | |

FOREIGN PATENT DOCUMENTS

| | | |
|---|---|---|
| EP | 3755027 A1 | 12/2020 |
| WO | 2016021979 A1 | 2/2016 |
| WO | 2016047628 A1 | 3/2016 |
| WO | 2016210302 A1 | 12/2016 |

OTHER PUBLICATIONS

Huawei et al. "Discussion on Remaining Issues on SS Raster." 3GPP TSG RAN WG1 Ad Hoc Meeting. R1-1801032, Jan. 24, 2018 (Jan. 24, 2018), sections 2.2.

OPPO. "Discussion on Synchronization Raster Indication." 3GPP TSG RAN WG1 Meeting AH 1801, R1-1800508., Jan. 13, 2018 (Jan. 13, 20183), entire document.

Written Opinion and its English Translation of the International Search Authority the international application No. PCT/CN2018/081468, dated Dec. 29, 2018.

3GPP TS 38.101-1 V15.0.0 (Dec. 2017) Technical Specification Group Radio Access Network, NR, User Equipment (UE) radio transmission and reception, Part 1: Range 1 Standalone (Release 15).

Supplementary European Search Report in the European application No. 18912512.3, dated Mar. 11, 2021.

"3rd Generation Partnership Project; Technical Specification Group Radio Access Network; NR; Base Station (BS) radio transmission and reception (Release 15)", 3GPP Standard; Technical Specification; 3GPP TS 38.104. 3rd Generation Partnership Project (3GPP), Mobile Competence Centre; 650, Route Des Lucioles; F-06921 Sophia-Antipolis Cedex; France, vol. RAN WG4, No. V15.0.0, Jan. 9, 2018 (Jan. 9, 2018), pp. 1-121, XP051392565, [retrieved on Jan. 9, 2018] *paragraph [5.4.3.1]*.

Huawei et al: "Remaining details on synchronization signal", 3GPP Draft; R1-1801327, 3rd Generation Partnership Project (3GPP), Mobile Competence Centre; 650, Route Des Lucioles; F-06921 Sophia-Antipolis Cedex ; France, vol. RAN WG1, No. Athens, Greece; Feb. 26, 2018-Mar. 2, 2018, Feb. 17, 2018 (Feb. 17, 2018), XP051397491, Retrieved form the Internet: URL:http://3gpp.org/ftp/tsg%5Fran/WG1%5FRL1/TSGR1%5F92/Docs/ [retrieved on Feb. 17, 2018] *paragraphs [02.1], [AnnexB]*.

ZTE Corporation et al: "Considerations on NR Sync Raster Shift", 3GPP Draft; R4-1801519—Considerations on NR Sync Raster Shift, 3rd Generation Partnership Project (3GPP). Mobile Competence Centre; 650, Route Des Lucioles; F-06921 Sophia-Antipolis Cedex; France, vol. RAN WG4, No. Athens, GR; Feb. 26, 2018-Mar. 2, 2018, Feb. 17, 2018 (Feb. 17, 2018), XP051402278, Retrieved from the Internet: URL:http://www.3gpp.org/ftp/tsg%5Fran/WG4%5FRadio/TSGR4%5F86/Docs.

Nokia: "Modification of SS raster offset", 3GPP Draft; R4-1802821 Draft CR SS Raster Offset to R4-1800265 Draftcr 38104-F00 Combined Updates From R4 AH-1801, 3rd Generation Partnership Project (3GPP), Mobile Competence Centre; 650, Route Des, vol. RAN WG4, No. Athens, Greece; Feb. 26, 2018-Ma. 2, 2018, Feb. 19, 2018 (Feb. 19, 2018), XP051402923, Retrieved from the Internet: URL:http://www.3gpp.org/ftp/tsg%5Fran/WG4%5FRadio/TSGR4%5F86/Docs/ [retrieved on Feb. 19, 2018] *paragraph [5.4.3.1]*.

Office Action of the Indian application No. 202027046866, dated Dec. 6, 2021.

First Office Action of the Korean application No. 10-2020-7031335, dated Dec. 29, 2021.

Ericsson, Remaining details on synchronization signal design[online], 3GPP TSG RAN WG1 adhoc_NR_AH_1709 R1-1716149, Internet <URL:http://www.3gpp.org/ftp/tsg_ran/WG1_RL1/TSGR1_AH/NR_AH_1709/Docs/R1-1716149.zip>.

First Office Action of the Japanese application No. 2020-552699, dated Jan. 28, 2022.

Notice of Allowance of the U.S. Appl. No. 17/031,758, dated Mar. 2, 2022.

Corrected Notice of Allowance of the U.S. Appl. No. 17/031,758, dated Apr. 11, 2022.

\* cited by examiner

| PSS | PBCH | SSS | PBCH |

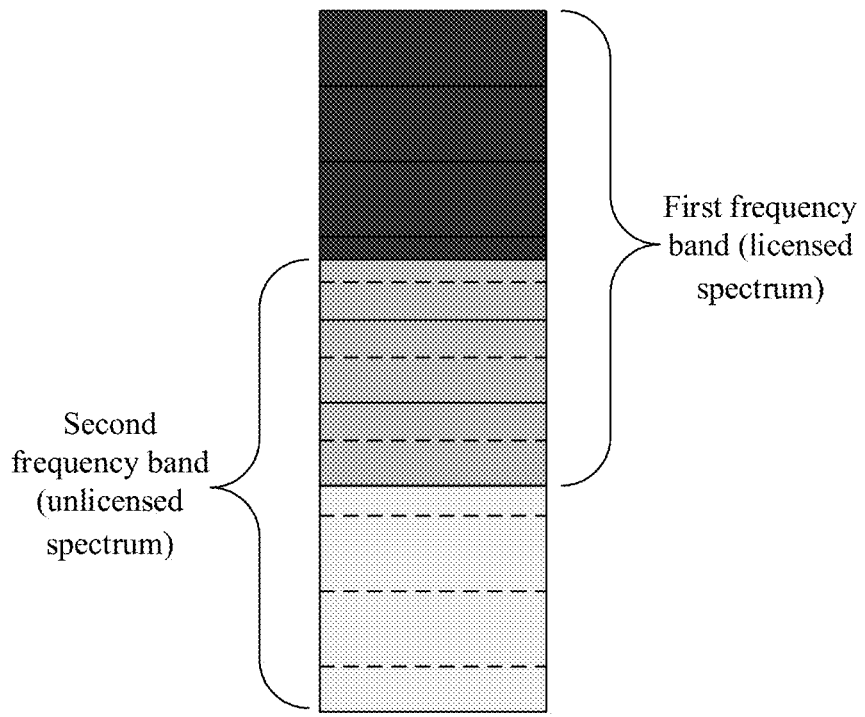

FIG. 5

The network device transmits an SSB to the terminal device, and the terminal device acquires indication information according to frequency domain position information of the SSB. The indication information is used to indicate an attribute of a carrier associated with the SSB, and the attribute of the carrier includes whether the carrier is used by a licensed carrier system or an unlicensed carrier system.  601

FIG. 6

INFORMATION INDICATION METHOD AND DEVICE

CROSS-REFERENCE TO RELATED APPLICATIONS

The present disclosure is a continuation application of U.S. patent application Ser. No. 17/031,758, now the U.S. Pat. No. 11,382,054, filed Sep. 24, 2020, which is a continuation application of International Patent Application No. PCT/CN2018/081468, filed on Mar. 30, 2018, the disclosures of which are hereby incorporated by reference in their entireties.

BACKGROUND

The unlicensed spectrum, which is allocated by countries and regions, can be used for radio equipment communication. The unlicensed spectrum is generally considered to be a shared spectrum, that is, communication devices in different communication systems can use the spectrum without applying for a proprietary spectrum authorization from the government if the communication devices meet the regulatory requirements of the spectrum made by the countries or the regions. New radio (NR) unlicensed technology is introduced in the 3rd Generation Partnership Project (3GPP) plans, for communication on the unlicensed spectrum using the NR technology.

There are some overlaps between unlicensed bands and licensed bands. In view of different considerations, spectrum supervision and allocation agencies in different countries have different plans and allocations for the spectrums. For example, 3.5 GHz is a licensed NR band in China, but is an unlicensed band in the United States. Similarly, 37 GHz may be grouped into a licensed NR band in China, but may be grouped into an unlicensed band in the United States. Due to the above differences in spectrum allocation, when a terminal roams in different countries or regions, some countries or regions deploy a NR unlicensed system and some countries or regions deploy a NR licensed system, for the same band (such as the 3.5 GH band). Especially for terminal equipment that supports Standalone NR unlicensed, it may be impossible to distinguish whether the access system is a licensed carrier system or an unlicensed carrier system based on the received Synchronization Signal Block (SSB). The terminal device cannot confirm the way to send and receive signals in the future.

SUMMARY

The present disclosure relates to the field of wireless communication technology, and more particularly to a method and device for information indication, and a computer storage medium, to solve the above technical problem.

A first aspect provides a method for information indication, which includes operations as follows.

A terminal device receives a synchronization signal block (SSB) sent by a network device.

The terminal device acquires indication information according to frequency domain position information of the SSB, and the indication information is used to indicate an attribute of a carrier associated with the SSB, and the attribute of the carrier includes whether the carrier is used by a licensed carrier system or an unlicensed carrier system.

A second aspect provides a method for information indication, which includes operations as follows.

A network device transmits a synchronization signal block (SSB) to a terminal device, so that the terminal device acquires indication information according to frequency domain position information of the SSB. The indication information is used to indicate an attribute of a carrier associated with the SSB, and the attribute of the carrier includes whether the carrier is used by a licensed carrier system or an unlicensed carrier system.

A third aspect provides a device for information indication, which includes a processor, a memory configured to store a software program and module executed by the processor, and a transmission device. The transmission device is configured to receive a synchronization signal block (SSB) transmitted by a network device. The processor is configured to execute the software program and module stored in the memory to acquire indication information according to frequency domain position information of the SSB. The indication information is used to indicate an attribute of a carrier associated with the SSB, and the attribute of the carrier includes whether the carrier is used by a licensed carrier system or an unlicensed carrier system.

A fourth aspect provides a device for information indication, which includes: a processor; a memory configured to store a software program and module executed by the processor; and a transmission device.

The transmission device is configured to transmit a synchronization signal block (SSB) to a terminal device. The terminal device acquires indication information according to frequency domain position information of the SSB. The indication information is used to indicate an attribute of a carrier associated with the SSB, and the attribute of the carrier includes whether the carrier is used by a licensed carrier system or an unlicensed carrier system.

BRIEF DESCRIPTION OF THE DRAWINGS

The drawings described herein are adopted to provide a further understanding to the present disclosure and form a part of the present disclosure. Schematic embodiments of the present disclosure and descriptions thereof are adopted to explain the present disclosure and not intended to form improper limits to the present disclosure. In the drawings:

FIG. 5 is a schematic diagram of a first synchronization raster and a second synchronization raster in an embodiment of the present disclosure.

FIG. 6 is a second flowchart of a method for information indication in an embodiment of the present disclosure.

DETAILED DESCRIPTION

In order to better understand the technical solutions of the embodiments of the present disclosure, the technologies related to the embodiments of the present disclosure will be described below.

1) Beam Transmission in the Fifth Generation Communication System (5G, 5$^{th}$ Generation)

Figures 1, 2:
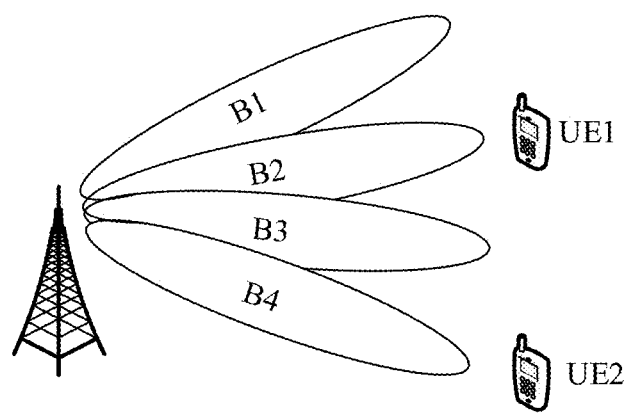
FIG. 1 is a schematic diagram showing a base station transmitting a wireless signal through a beam.
FIG. 2 is a schematic composition diagram of a SSB.

Since a frequency band used in the 5G system is higher than that of Long Term Evolution (LTE), a path loss of transmission of a wireless signal becomes large and coverage of the wireless signal becomes small in the 5G system. In this case, a feasible method is to form a beam by using the beamforming technology through a multi-antenna system of a base station, to improve a gain of the wireless signal and remedy the path loss. The beam is directional, and a narrow beam can only cover a part area of the cell, and cannot cover all users in the cell. As shown in FIG. 1, the base station can transmit signals through four beams in different directions. Beam B2 can only cover User Equipment (UE) 1, and cannot cover UE2.

Common channels and signals in the 5G NR system, such as synchronization signals and broadcast channels, need multi-beam scanning to cover the entire cell, for facilitating reception by UEs in the cell. Multi-beam transmission of Synchronization Signal (SS) is implemented by defining an SS burst set. The SS burst set contains one or more SS bursts, and an SS burst contains one or more SS Blocks (also referred to as SSB). The SS block is used to carry a synchronization signal and a broadcast channel of a beam. Therefore, the SS burst set can contain the synchronization signals of the beams, the number of beams is equal to the number of SS blocks in the cell. The SS block contains a Primary Synchronization Signal (PSS) of one symbol, a Secondary Synchronization Signal (SSS) of one symbol, and New Radio access Technology-Physical Broadcast Channel (NR-PBCH) of two symbols, as shown in FIG. 2.

A period of the SS burst set is configurable, and the SS burst set transmitted within one period is transmitted within a time window of 5 ms. Taking a sub-carrier interval of 15 kHz as an example, a slot contains 14 symbols and can carry two SS blocks.

In addition to that the synchronization signal and the PBCH require the multi-beam scanning, other common information, such as the Remaining Minimum System Information (RMSI) and paging messages, also need to be transmitted by multi-beam scanning.

2) Control Resource Set (CORESET)

In the 5G NR system, a common search space is required to be defined for an initially-accessed UE for receiving common control information, such as RMSI. Therefore, the concept of CORESET is introduced to define a resource set carrying control information. The UE detects a New Radio access Technology-Physical Downlink Control Channel (NR-PDCCH) in the resource set to obtain scheduling information of the New Radio access Technology-Physical Downlink Shared Channel (NR-PDSCH) for carrying the RMSI. The indication information of CORESET corresponding to the RMSI is carried in an information field RMSI-PDCCH-Config in the NR-PBCH, used by the UE to receive the RMSI. Configuration information of CORESET mainly contains the following information: frequency domain resources, an orthogonal Frequency Division Multiplexing (OFDM) symbol and length of time.

3) CORESET Information Related to RMSI in the NR-PBCH

When the UE needs to access the network, the UE obtains system messages from the network, a part of which is carried by the NR-PBCH and a part of which is carried by the NR-PDSCH. The system message carried by the NR-PDSCH includes RMSI. Downlink Control Information (DCI) corresponding to the NR-PDSCH is carried by the NR-PDCCH, and a location of a time-frequency resource where the NR-PDCCH is arranged is indicated by CORESET information carried by the NR-PBCH, that is, Type0-PDCCH common search space information. Also, the NR-PBCH also carries information, that is, RMSI presence flag information, for indicating whether the SS block is associated with the RMSI or the Type0-PDCCH common search space. The RMSI presence flag information indicates that the current SS block is not associated with RMSI or Type0-PDCCH common search space through a reserved value in the PRB grid offset information field. The PRB grid offset information field includes 4 or 5 bits, which is used to indicate an offset between physical resource block (PRB) grids between channels or signals of the synchronous signal block and the non-synchronous signal block. The offset includes 0-11 or 0-23 subcarriers. Therefore, the PRB grid offset information field further includes 4 or 8 reserved values for indicating that the current SS block is not associated with the RMSI or the Type0-PDCCH common search space.

RMSI-PDCCH-Config information is indicated by 8 bits. When the PRB grid offset information field indicates that the current SS block is not associated with the RMSI or the Type0-PDCCH common search space, the RMSI-PDCCH-Config information field is used to indicate frequency domain position information of the synchronization signal block, for reducing blind detection performed by the UE. The PBCH in the synchronization signal block is detected according to the frequency domain position information of the synchronization signal block, to acquire the RMSI-PDCCH-Config information, and further receive the RMSI.

4) Synchronization Raster

For the wireless frequency spectrum in NR, the frequency domain position of the synchronization signal block is defined by the synchronization raster, as shown in Table 1 below. In different frequency ranges, possible frequency domain positions of the synchronization signal block are determined by the formula in Table 1 and are numbered by SSREF.

TABLE 1

| Frequency range | Frequency domain position of SSB | Range of SSREF |
| --- | --- | --- |
| 0-2650 MHz | N × 900 kHz + M × 5 kHz, N = 1:[2944], M = −1:1 | 1-[8832] |
| 2400-24250 MHz | 2400 MHz + N × 1.44 MHz, N = 0:[15173] | [8833-24006] |
| 24250-100000 MHz | [24250.08] MHz + N × [17.28] MHz, N = 0:[4383] | [24007-28390] |

After the synchronization raster is determined, resource mapping of the synchronization signal block is determined according to Table 2 below. That is, the synchronization raster is located in a RE numbered 0 of a PRB numbered 10 of 20 PRBs of the synchronization signal block.

TABLE 2

| RE Index k | 0 |
| --- | --- |
| PRB number $n_{PRB}$ corresponding to SSB | $n_{PRB}$ = 10 |

For a synchronization raster, a distribution of the synchronization rasters in different frequency bands is determined by Table 3 below. For example, for a band n77, the number of the synchronization raster ranges from 9460 to 10079, there is a total of 620 synchronization rasters.

TABLE 3

| NR bandwidth | SSB SCS | Range of GSCN (Start value-<step>-end value) |
|---|---|---|
| n1 | 15 kHz | 7033-<1>-7224 |
| n2 | 15 kHz | 6433-<1>-6624 |
| n3 | 15 kHz | 6016-<1>-6258 |
| n5 | 15 kHz | 2896-<1>-2973 |
|  | 30 kHz | 2911-<1>-2961 |
| n7 | 15 kHz | 8734-<1>-8958 |
| n8 | 15 kHz | 3082-<1>-3192 |
| n20 | 15 kHz | 2635-<1>-2730 |
| n28 | 15 kHz | 2527-<1>-2670 |
| n38 | 15 kHz | 8566-<1>-8724 |
| n41 | 15 kHz | 8899-<1>-9030 |
| n50 | 15 kHz | 4774-<1>-5049 |
| n51 | 15 kHz | 4756-<1>-4764 |
| n66 | 15 kHz | 7033-<1>-7326 |
|  | 30 kHz | 7048-<1>-7317 |
| n70 | 15 kHz | 6649-<1>-6726 |
| n71 | 15 kHz | 2056-<1>-2166 |
| n74 | 15 kHz | 4915-<1>-5052 |
| n75 | 15 kHz | 4774-<1>-5049 |
| n76 | 15 kHz | 4756-<1>-4764 |
| n77 | 30 kHz | 9460-<1>-10079 |
| n78 | 30 kHz | 9460-<1>-9801 |
| n79 | 30 kHz | 10245-<1>-10613 |

5) Indication Method of SSB

When the reserved value in the PRB grid offset information field ($k_{SSB}$) indicates that the current SSB is not associated with the RMSI or the Type0-PDCCH common search space, frequency domain location information of the second SSB (the current SSB is the first SSB) is indicated by the bit in the RMSI-PDCCH-Config information field. Since the RMSI-PDCCH-Config information field contains 8 bits, positions of 256 synchronization rasters can be indicated by indicating an offset of a target synchronization raster relative to a synchronization raster corresponding to the current synchronization signal block. The positions of N×265 synchronization rasters can be indicated based on different reserved values in the PRB grid offset information field. For the frequency range (FR) 1 and FR2, an offset of a GSCN of the synchronization raster corresponding to the target SSB relative to the GSCN of the synchronized raster corresponding to the current SSB is indicated by $k_{SSB}$ and RMSI-PDCCH-Config, respectively according to Table 4 and Table 5. An indication range in Table 4 includes −768 . . . −1, 1 . . . 768, and an indication range in Table 5 includes −256 . . . −1, 1 . . . 256. $k_{SSB}$=30 is a reserved value in Table 4, and $k_{SSB}$=14 is a reserved value in Table 5.

TABLE 4

| $k_{SSB}$ | RMSI-PDCCH-Config | $N_{GSCN}^{Offset}$ |
|---|---|---|
| 24 | 0, 1, . . . , 255 | 1, 2, . . . , 256 |
| 25 | 0, 1, . . . , 255 | 257, 258, . . . , 512 |
| 26 | 0, 1, . . . , 255 | 513, 514, . . . , 768 |
| 27 | 0, 1, . . . , 255 | −1, −2, . . . , −256 |
| 28 | 0, 1, . . . , 255 | −257, −258, . . . , −512 |
| 29 | 0, 1, . . . , 255 | −513, −514, . . . , −768 |
| 30 | 0, 1, . . . , 255 | Reserved, Reserved, . . . , Reserved |

TABLE 5

| $k_{SSB}$ | RMSI-PDCCH-Config | $N_{GSCN}^{Offset}$ |
|---|---|---|
| 12 | 0, 1, . . . , 255 | 1, 2, . . . , 256 |
| 13 | 0, 1, . . . , 255 | −1, −2, . . . , −256 |
| 14 | 0, 1, . . . , 255 | Reserved, Reserved, . . . , Reserved |

Also, when the UE receives $k_{SSB}$=31 corresponding to FR1 or $k_{SSB}$=15 corresponding to FR2, the UE considers that there is no SS/PBCH block associated with the Type0-PDCCH common search space within the GSCN range [$N_{GSCN}^{Reference}-N_{GSCN}^{Start}$, $N_{GSCN}^{Reference}+N_{GSCN}^{End}$], $N_{GSCN}^{Start}$ and $N_{GSCN}^{End}$ is determined according to the higher 4 bits and lower 4 bits of RMSI-PDCCH-Config.

The solutions in the embodiments of the present disclosure are described in detail in conjunction with the embodiments.

In the embodiments of the present disclosure, the terminal device may also be referred to as a User Equipment (UE), an access terminal, a user unit, a user station, a mobile station, a mobile radio station, a remote station, a remote terminal, a mobile device, a user terminal, a terminal, a wireless communication device, a user agent or a user device. The terminal device may be a Station (ST) in Wireless Local Area Networks (WLAN), a cellular phone, a cordless phone, a Session Initiation Protocol (SIP) phone, or a Wireless Local Loop (WLL) station, a Personal Digital Assistant (PDA) device, a handheld device with a wireless communication capability, a computing devices or other processing devices connected to wireless modems, an on-board device, a wearable device, and a next-generation communication system, for example, a terminal device in the fifth-generation (5G) network or a terminal device in a Public Land Mobile Network (PLMN) that will evolve in the future. In the embodiments of the present disclosure, the terminal device may also be a wearable device. The wearable device can also be referred to as a wearable smart device which is a general term of a wearable devices developed by applying wearable technology to perform smart design of daily wearing, such as glasses, gloves, watches, clothes and shoes.

In the embodiments of the present disclosure, a network device may be a device for communicating with a mobile device, and the network device may be an Access Point (AP) in WLAN, a Base Transceiver Station (BTS) in GSM or CDMA, a NodeB (NB) in WCDMA, an Evolutional Node B (eNB or eNodeB) in LTE, a relay station or an access point, an on-board device, a wearable device, and a network device in the NR network or a network device in the PLMN network that will evolve in the future.

Figure 3:
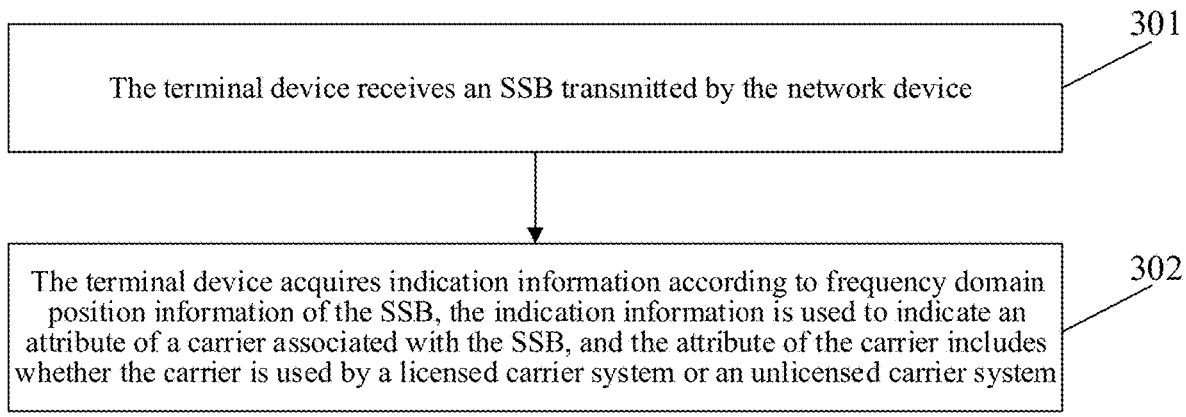
FIG. 3 is a first flowchart of a method for information indication in an embodiment of the present disclosure.

FIG. 3 is a first schematic flowchart of a method for information indication in an embodiment of the present disclosure. As shown in FIG. 3, the method for information indication includes operations 301 and 302.

At 301, a terminal device receives an SSB transmitted by a network device.

At 302, the terminal device acquires indication information according to frequency domain position information of the SSB. The indication information is used to indicate an attribute of a carrier associated with the SSB, and the attribute of the carrier includes whether the carrier is used by a licensed carrier system or an unlicensed carrier system.

In an embodiment of the present disclosure, considering that there are some overlapping portions between the unlicensed band and the licensed band, a different method for calculating a position of a synchronization raster (sync raster) in the unlicensed band from that in the licensed band is set, to meet a condition that a position of a synchronization raster on the unlicensed band does not overlap with a position of a synchronization raster on the licensed band. When the terminal device detects the SSB, the terminal device can determine that whether a carrier associated with SSB is used by a licensed carrier system or an unlicensed carrier system according to a position of a synchronization raster where the SSB is located.

In an embodiment of the present disclosure, the attribute of the carrier associated with the SSB includes whether the carrier is used by a licensed carrier system or an unlicensed carrier system. In other words, the attribute of the carrier associated with the SSB includes whether the SSB on the carrier is transmitted by a licensed carrier system or an unlicensed carrier system.

In an embodiment of the present disclosure, the terminal device acquires the indication information according to a position of a synchronization raster where the detected SSR is located.

Further, in response to detecting that the SSB is located at a position of a first synchronization raster, the terminal determines that the carrier associated with the SSB is used by a licensed carrier system. In response to detecting the SSB is located at a position of a second synchronization raster, the terminal device determines that the carrier associated with the SSB is used by an unlicensed carrier system.

The carrier associated with the SSB refers to a carrier which uses the SSB for transmission and reception of a subsequent signal.

Here, how the terminal device determines whether a synchronization raster where the detected SSB is located belongs to the first synchronization raster or the second synchronization raster can be implemented in the following manner.

The terminal device determines the position of the first synchronization raster based on a first set of formulas.

The terminal device determines the position of the second synchronization raster based on a second set of formulas.

The position of the first synchronization raster determined by the first set of formulas and the position of the second synchronization raster determined by the second set of formulas meet the following relationship: the first synchronization raster and the second synchronization raster have synchronization rasters at different positions within an overlapping bandwidth between a first frequency band and a second frequency band. The first frequency band is a licensed spectrum and the second frequency band is an unlicensed spectrum.

Figure 4:
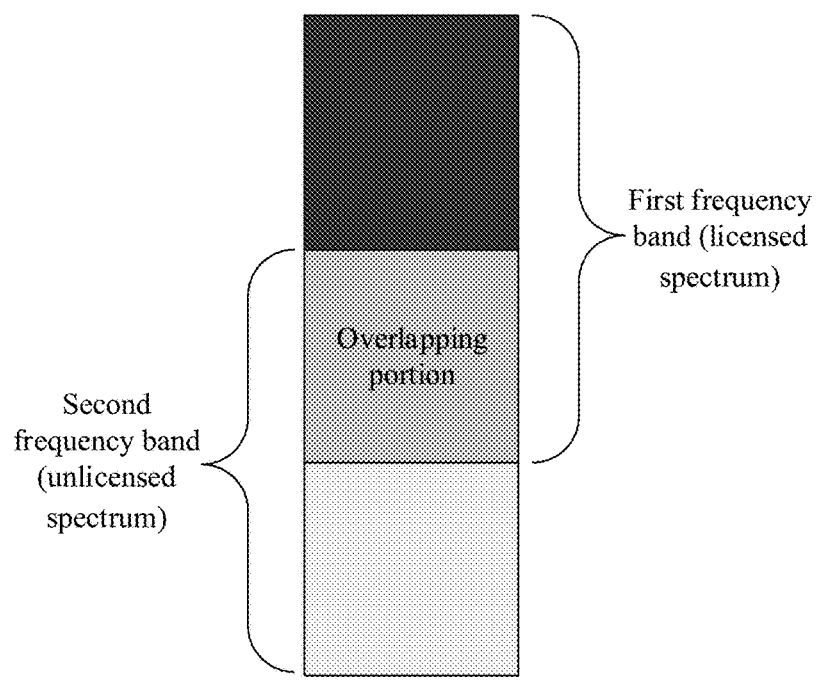
FIG. 4 is a structure diagram of a first frequency band and a second frequency band in an embodiment of the present disclosure.

As shown in FIG. 4, the first frequency band is a licensed spectrum and the second frequency band is an unlicensed spectrum. The first frequency band and the second frequency band have an overlapping portion.

In an embodiment, the position of the first synchronization raster corresponding to the first frequency band may be calculated using the formula shown in Table 1.

If the first frequency band is between 0 and 2650 MHz, the position of the first synchronization raster is determined based on the formula N×900 kHz+M×5 kHz, N=1:[2944], M=−1:1.

If the first frequency band is between 2400 and 24250 MHz, the position of the first synchronization raster is determined based on the formula 2400 MHz+N×1.44 MHz, N=0:[15173].

If the first frequency band is between 24250 and 100000 MHz, the position of the first synchronization raster is determined based on the formula [24250.08] MHz+N×[17.28] MHz, N=0:[4383].

In an embodiment, a new method of calculating a position of the synchronization raster is defined for the position of the second synchronization raster corresponding to the second frequency band.

If the second frequency band is between 0 and 2650 MHz, the position of the second synchronization raster is determined based on a formula N×900 kHz+M×5 kHz+O1, N=1:[2944], M=−1:1.

If the second frequency band is between 2400 and 24250 MHz, the position of the second synchronization raster is determined based on a formula 2400 MHz+N×1.44 MHz+O2, N=0:[15173].

If the second frequency band is between 24250 and 100000 MHz, the position of the second synchronization raster is determined based on a formula [24250.08] MHz+N×[17.28] MHz+O3, N=0:[4383].

O1, O2, and O3 denote synchronization raster offsets.

The position of the above second synchronization raster is obtained by adding an offset to the position of the first synchronization raster, so that the first synchronization raster and the second synchronization raster do not overlap with each other. As shown in Table 6 below, in an example, O1=450 kHz, O2=0.72 MHz, and O3=8.64 MHz. It should be understood that the values of O1, O2, and O3 are not unique.

TABLE 6

| Frequency domain range | SSB frequency domain position | SSRE range |
| --- | --- | --- |
| 0-2650 MHz | N*900 kHz + M*5 kHz + O1, N = 1:[2944], M = −1:1 | 1-[8832] |
| 2400-24250 MHz | 2400 MHz + N*1.44 MHz + O2, N = 0:[15173] | [8833-24006] |
| 24250-100000 MHz | [24250.08] MHz + N*[17.28] MHz + O3, N = 0:[4383] | [24007-28390] |

A new synchronization raster calculation formula can also be defined separately for the unlicensed band, which is different from the existing synchronization raster calculation formula. As shown in FIG. 5, the position of the first synchronization raster corresponding to the first frequency band is shown by a solid line; and the position of the second synchronization raster corresponding to the second frequency band is shown by a dotted line. Since the first synchronization raster and the second synchronization raster are determined by different formulas, it can be ensured the positions of the synchronization rasters corresponding to the licensed band and the unlicensed band do not overlap in the overlapping portion of the first bandwidth and the second bandwidth.

FIG. 6 is a second schematic flowchart of a method for information indication in an embodiment of the present disclosure. As shown in FIG. 6, the method for information indication includes operations 601

At 601, a network device transmits an SSB to a terminal device, so that the terminal device acquires indication information according to frequency domain position information of the SSB, and the indication information is used to indicate an attribute of a carrier associated with the SSB, and the attribute of the carrier includes whether the carrier is used by a licensed carrier system or an unlicensed carrier system.

In an embodiment of the present disclosure, the attribute of the carrier associated with the SSB include whether the carrier is used by a licensed carrier system or an unlicensed carrier system. In other words, the attribute of the carrier associated with the SSB includes whether the SSB on the carrier is sent by a licensed carrier system or an unlicensed carrier system.

In the embodiment of the present disclosure, the operation that the network device transmits an SSB to the terminal device includes operations as follows.

The network device transmits an SSB to the terminal device in a position of a first synchronization raster, and the terminal device detects that the SSB is located at the position of the first synchronization raster to determine that the carrier associated with the SSB is used by the licensed carrier system.

Alternatively, the network device transmits an SSB to the terminal device in a position of a second synchronization raster, and the terminal device detects that the SSB is located at a position of a second synchronization raster to determine that the carrier associated with the SSB is used by the unlicensed carrier system.

In an embodiment, the network device determines the position of the first synchronization raster based on a first set of formulas.

The network device determines the position of the second synchronization raster based on a second set of formulas.

The position of the first synchronization raster determined by the first set of formulas and the position of the second synchronization raster determined by the second set of formulas meets the following relationship: the first synchronization raster and the second synchronization raster have synchronization rasters at different positions within an overlapping bandwidth of the first frequency band and the second frequency band. The first frequency band is a licensed spectrum and the second frequency band is an unlicensed spectrum.

For example, the operation that the network device determines the position of the second synchronization raster based on the second set of formulas includes operations as follows.

If the second frequency band is between 0 and 2650 MHz, the position of the second synchronization raster is determined based on a formula N×900 kHz+M×5 kHz+O1, N=1:[2944], M=−1:1.

If the second frequency band is between 2400 and 24250 MHz, the position of the second synchronization raster is determined based on a formula 2400 MHz+N×1.44 MHz+O2, N=0:[15173].

If the second frequency band is between 24250 and 100000 MHz, the position of the second synchronization raster is determined based on a formula [24250.08] MHz+N×[17.28] MHz+O3, N=0:[4383].

O1, O2, and O3 denote synchronization raster offsets.

The operation that the network device determines the position of the first synchronization raster based on the first set of formulas includes operations as follows.

If the first frequency band is between 0 and 2650 MHz, the position of the first synchronization raster is determined based on the formula N×900 kHz+M×5 kHz, N=1:[2944], M=−1:1.

If the first frequency band is between 2400 and 24250 MHz, the position of the first synchronization raster is determined based on the formula 2400 MHz+N×1.44 MHz, N=0:[15173].

If the first frequency band is between 24250 and 100000 MHz, the position of the first synchronization raster is determined based on the formula [24250.08] MHz+N×[17.28] MHz, N=0:[4383].

Those skilled in the art should understand that the above method at the network device side may be understood by referring to the above method at the terminal device, and specific examples are not be elaborated here.

Figure 7:
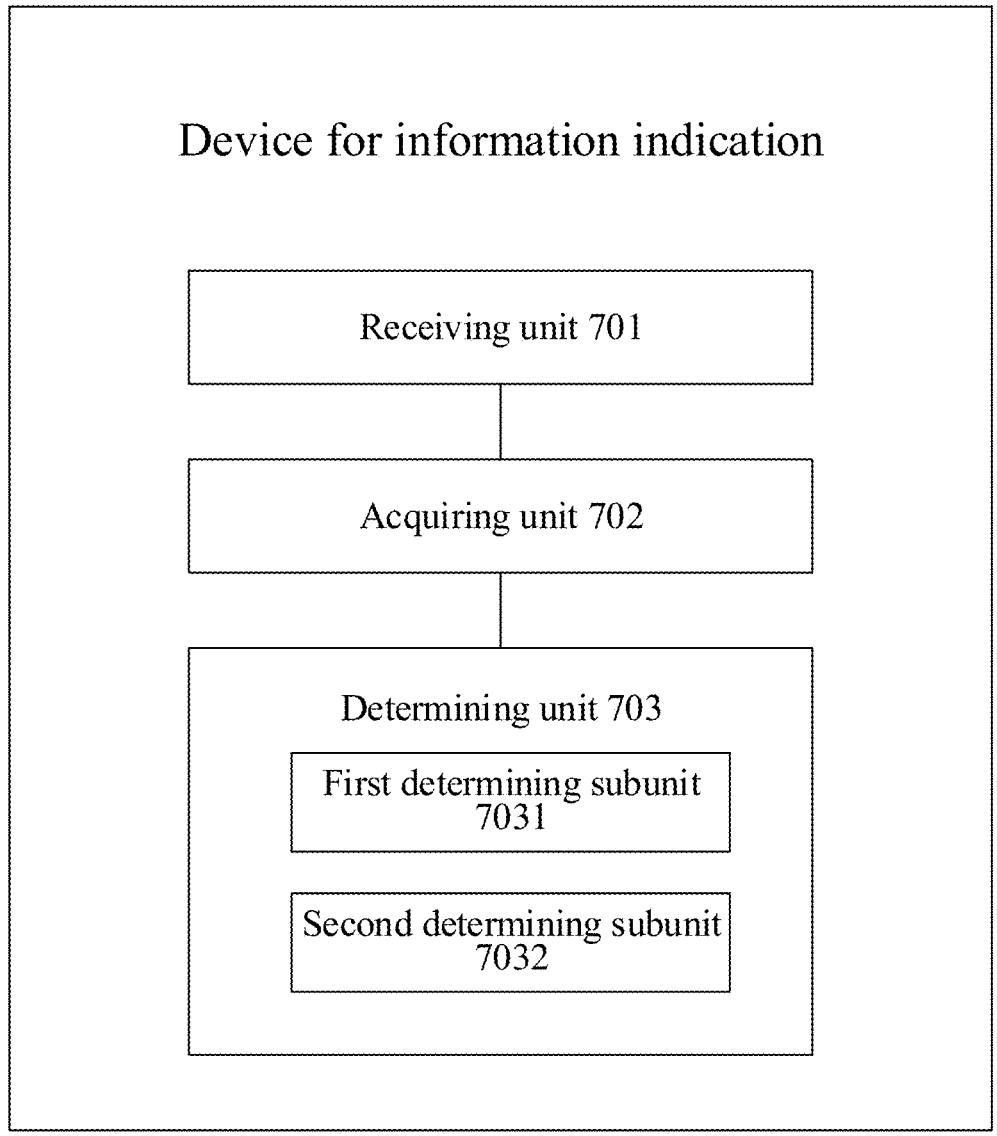
FIG. 7 is a first schematic structural diagram of a device for information indication in an embodiment of the present disclosure.

FIG. 7 is a first schematic structural diagram of a device for information indication in an embodiment of the present disclosure. As shown in FIG. 7, the device for information indication includes a receiving unit 701 and an acquiring unit 702.

The receiving unit 701 is configured to receive an SSB transmitted by a network device.

The acquiring unit 702 is configured to acquire indication information according to frequency domain position information of the SSB. The indication information is used to indicate an attribute of a carrier associated with the SSB, and the attribute of the carrier includes whether the carrier is used by a licensed carrier system or an unlicensed carrier system.

In an embodiment of the present disclosure, the attribute of the carrier associated with the SSB includes whether the carrier is used by a licensed carrier system or an unlicensed carrier system. In other words, the attribute of the carrier associated with the SSB includes whether the SSB on the carrier is transmitted by a licensed carrier system or an unlicensed carrier system.

In an embodiment, the acquiring unit 702 is configured to acquire the indication information according to a position of a synchronization raster where the detected SSB is located.

In an embodiment, the device further includes a determining unit 703.

The determining unit 703 is configured to determine that the carrier associated with the SSB is used by the licensed carrier system in response to that it is detected that the SSB is located at a position of a first synchronization raster, and determine that the carrier associated with the SSB is used by the unlicensed carrier system in response to that it is detected that the SSB is located at a position of a second synchronization raster.

In an embodiment, the determining unit 703 includes a first determining subunit 7031 and a second determining subunit 7032.

The first determining subunit 7031 is configured to determine the position of the first synchronization raster based on a first set of formulas.

The second determining subunit 7032 is configured to determine the position of the second synchronization raster based on a second set of formulas.

The position of the first synchronization raster determined by the first set of formulas and the position of the second synchronization raster determined by the second set of formulas meet the following relationship: the first synchronization raster and the second synchronization raster have synchronization rasters at different positions within an overlapping bandwidth of the first frequency band and the second frequency band. The first frequency band is a licensed spectrum and the second frequency band is an unlicensed spectrum.

In the embodiment, the second determining subunit 7032 is configured to perform the following operations.

If the second frequency band is between 0 and 2650 MHz, the position of the second synchronization raster is determined based on a formula N×900 kHz+M×5 kHz+O1, N=1:[2944], M=−1:1.

If the second frequency band is between 2400 and 24250 MHz, the position of the second synchronization raster is determined based on a formula 2400 MHz+N×1.44 MHz+O2, N=0:[15173].

If the second frequency band is between 24250 and 100000 MHz, the position of the second synchronization raster is determined based on a formula [24250.08] MHz+N×[17.28] MHz+O3, N=0:[4383].

O1, O2, and O3 denote synchronization raster offsets.

In the embodiment, the first determining subunit 7031 is configured to perform operations as follows.

If the first frequency band is between 0 and 2650 MHz, the position of the first synchronization raster is determined based on the formula N×900 kHz+M×5 kHz, N=1:[2944], M=−1:1.

If the first frequency band is between 2400 and 24250 MHz, the position of the first synchronization raster is determined based on the formula 2400 MHz+N×1.44 MHz, 0:[15173].

If the first frequency band is between 24250 and 100000 MHz, the position of the first synchronization raster is determined based on the formula [24250.08] MHz+N× [17.28] MHz, N=0:[4383].

Those skilled in the art should understand that the implementation function of each unit in the device for information indication shown in FIG. 7 can be understood by referring to related description of the above method for information indication. The function of each unit in the device for information indication shown in FIG. 7 may be implemented by a program running on a processor or a specific logic circuit.

Figure 8:
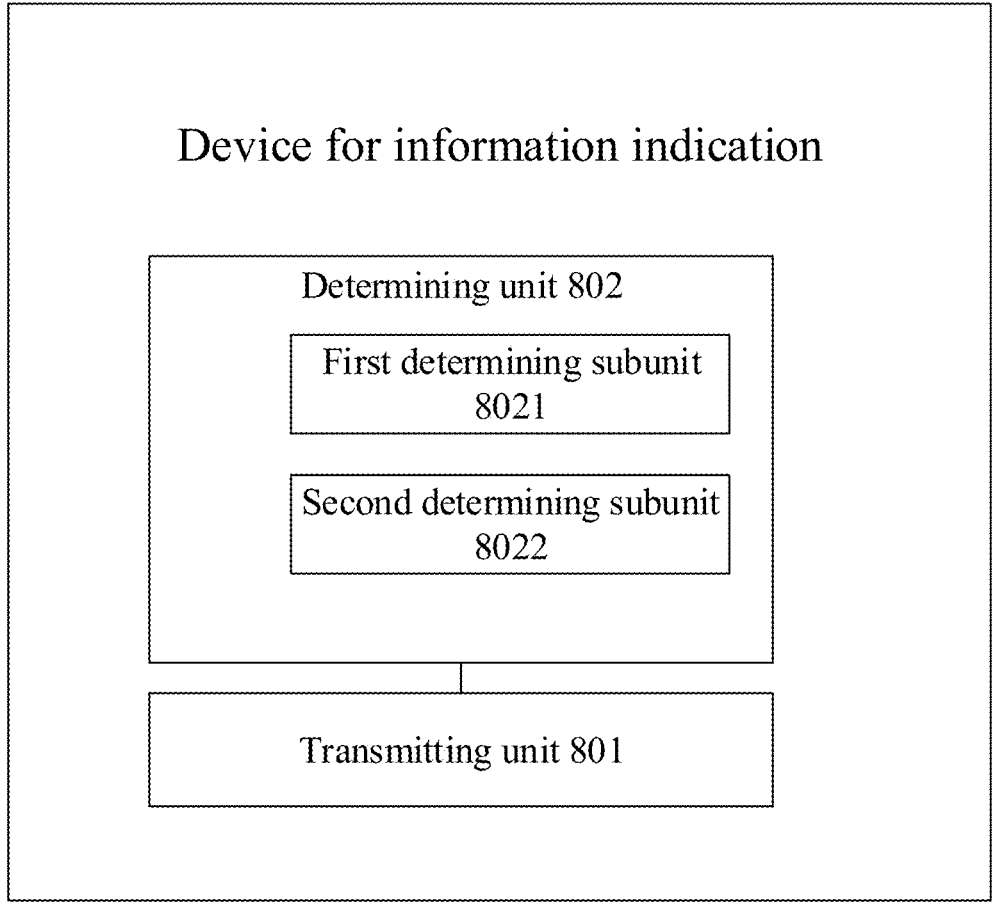
FIG. 8 is a second schematic structural diagram of a device for information indication in an embodiment of the present disclosure.

FIG. 8 is a second schematic structural diagram of a device for information indication in an embodiment of the present disclosure. As shown in FIG. 8, the device for information indication includes a transmitting unit 801.

The transmitting unit 801 is configured to transmit an SSB to a terminal device, so that the terminal device acquires indication information according to frequency domain position information of the SSB, and the indication information is used to indicate an attribute of a carrier associated with the SSB, and the attribute of the carrier includes whether the carrier is used by a licensed carrier system or an unlicensed carrier system.

In an embodiment of the present disclosure, the attribute of the carrier associated with the SSB include whether the carrier is used by a licensed carrier system or an unlicensed carrier system. In other words, the attribute of the carrier associated with the SSB includes whether the SSB on the carrier is sent by a licensed carrier system or an unlicensed carrier system.

In an embodiment, the transmitting unit 801 is configured to transmit an SSB to the terminal device in a position of a first synchronization raster, so that the terminal device detects that the SSB is located in the position of the first synchronization raster to determine that the carrier associated with the SSB is used by the licensed carrier system; transmit an SSB to the terminal device in a position of a second synchronization raster, so that the terminal device detects that the SSB is located in the position of the second synchronization raster to determine that the carrier associated with the SSB is used by the unlicensed carrier system.

In an embodiment of the present disclosure, the device further includes a determining unit 802. The determining unit 802 includes a first determining subunit 8021 and a second determining subunit 8022.

The first determining subunit 8021 is configured to determine the position of the first synchronization raster based on a first set of formulas.

The second determining subunit 8022 is configured to determine the position of the second synchronization raster based on a second set of formulas.

The position of the first synchronization raster determined by the first set of formulas and the position of the second synchronization raster determined by the second set of formulas meets the following relationship: the first synchronization raster and the second synchronization raster have synchronization rasters at different positions within an overlapping bandwidth of the first frequency band and the second frequency band.

The first frequency band is a licensed spectrum and the second frequency band is an unlicensed spectrum.

In the embodiment, the second determining subunit 8022 is configured to perform the following operations.

If the second frequency band is between 0 and 2650 MHz, the position of the second synchronization raster is determined based on the formula N×900 kHz+M×5 kHz+O1, N=1:[2944], M=−1:1.

If the second frequency band is between 2400 and 24250 MHz, the position of the second synchronization raster is determined based on the formula 2400 MHz+N×1.44 MHz+ O2, N=0:[15173].

If the second frequency band is between 24250 and 100000 MHz, the position of the second synchronization raster is determined based on the formula [24250.08] MHz+ N×[17.28] MHz+O3, N=0:[4383].

O1, O2, and O3 denote synchronization raster offsets.

In the embodiment, the first determining subunit 8021 is configured to perform operations as follows.

If the first frequency band is between 0 and 2650 MHz, the position of the first synchronization raster is determined based on the formula N×900 kHz+M×5 kHz, N=1:[2944], M=−1:1.

If the first frequency band is between 2400 and 24250 MHz, the position of the first synchronization raster is determined based on the formula 2400 MHz+N×1.44 MHz, 0:[15173].

If the first frequency band is between 24250 and 100000 MHz, the position of the first synchronization raster is determined based on the formula [24250.08] MHz+N× [17.28] MHz, N=0:[4383].

Those skilled in the art should understand that the implementation function of each unit in the device for information indication shown in FIG. 8 can be understood by referring to the related description of the above method for information indication. The function of each unit in the device for information indication shown in FIG. 8 may be implemented by a program running on a processor or a specific logic circuit.

When being implemented in form of software functional module and sold or used as an independent product, the above device for information indication in the embodiment of the present disclosure may be stored in a computer-readable storage medium. Based on such an understanding, the essential parts of the technical solutions of the embodiments of the present disclosure or parts of the technical solutions of the embodiments of the disclosure making contributions to the conventional art may be embodied in form of software product, and the computer software product is stored in a storage medium, and includes a plurality of instructions configured to enable a computer device (which may be a personal computer, a server, a network device or the like) to execute all or a part of the method in each embodiment of the present disclosure. The above storage medium includes: various media capable of storing program codes such as a U disk, a mobile hard disk, a Read Only Memory (ROM), a magnetic disk or an optical disk. Therefore, the embodiments of the present disclosure are not limited to any specific hardware and software combination.

Correspondingly, the embodiments of the present disclosure also provide a computer storage medium, in which a computer-executable instruction is stored, the computer-executable instruction being executed by a processor to implement the method for information indication of the embodiments of the present disclosure.

Figure 9:
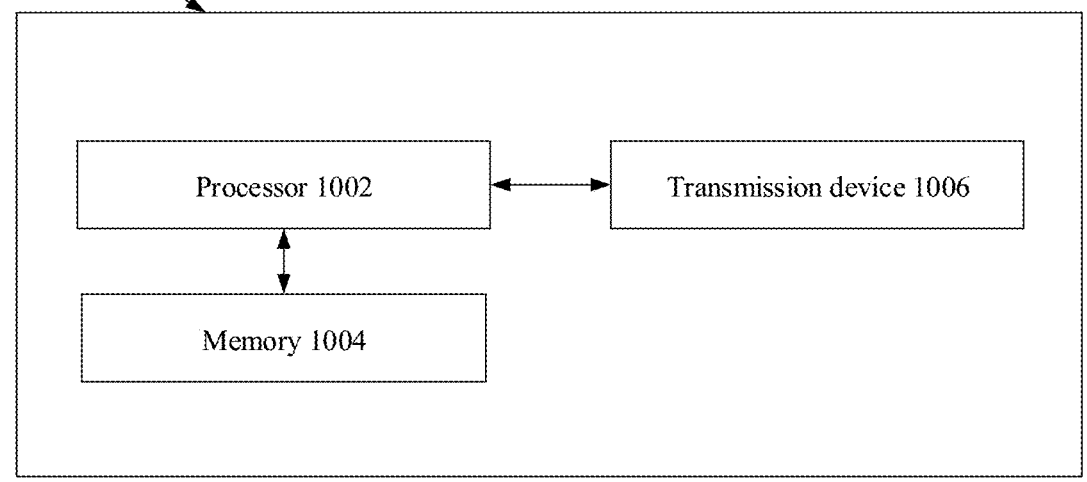
FIG. 9 is a schematic structure diagram of a computer device in an embodiment of the present disclosure.

FIG. 9 is a schematic structural diagram of a computer device according to an embodiment of the present disclosure. The computer device may be a terminal or may also be a network device. As shown in FIG. 9, the computer device 100 may include one or more (only one processor is shown in FIG. 9) processors 1002 (the processor 1002 may include, but be not limited to, a processing device such as a Micro Control Unit (MCU) or a Field Programmable Gate Array (FPGA)), a memory 1004 configured to store data and a transmission device 1006 configured for a communication function. Those of ordinary skill in the art should know that the structure shown in FIG. 6 is only schematic and not intended to limit the structure of the electronic device. For example, the computer device 100 may further include components more or fewer than the components shown in FIG. 9 or has a configuration different from that shown in FIG. 9.

The memory 1004 may be configured to store a software program and a module of application software, for example, a program instruction/module corresponding to the method in the embodiments of the disclosure. The processor 1002 runs the software program and module stored in the memory 1004 to execute various functional applications and data processing, namely implementing the abovementioned method. The memory 1004 may include a high-speed random access memory and may also include a nonvolatile memory, for example, one or more magnetic storage devices, flash memories or other nonvolatile solid-state memories. In some examples, the memory 1004 may further include a memory arranged remotely relative to the processor 1002, and the remote memory may be connected to the computer device 100 through a network. An example of the network includes, but is not limited to, the Internet, an intranet, a local area network, a mobile communication network and a combination thereof.

The transmission device 1006 is configured to receive or send data through a network. A specific example of the network may include a wireless network provided by a communication provider of the computer device 100. In an example, the transmission device 1006 includes a Network Interface Controller (NIC), which may be connected with another network device through a base station, thereby communicating with the Internet. In an example, the transmission device 1006 may be a Radio Frequency (RF) module, configured to communicate with the Internet in a wireless manner.

The technical solutions recorded in the embodiments of the present disclosure may be combined in any manner without conflicts.

In some embodiments provided by the present disclosure, it is to be understood that the present disclosed method and intelligent device may be implemented in another manner. The device embodiment described above is only schematic. For example, division of the units is only logic function division, and other division manners may be adopted during practical implementation. For example, multiple units or components may be combined or integrated into another system, or some characteristics may be neglected or not executed. In addition, coupling or direct coupling or communication connection between displayed or discussed components may be indirect coupling or communication connection, implemented through some interfaces, the device or the units, and may be electrical and mechanical or adopt other forms.

The units described as separate parts may be or may not be physically separated, and parts displayed as units may be or may not be physical units, that is, may be located in the same place, or may also be distributed to multiple network units. A part or all of the units may be selected according to a practical requirement to achieve the purposes of the solutions of the embodiments.

In addition, the functional units in each embodiment of the disclosure may be all integrated into a second processing unit, each unit may also serve as an independent unit, or two or more than two units may also be integrated into a unit. The integrated unit may be implemented in a hardware form and may also be implemented in form of hardware and software functional unit.

The foregoing is only the specific implementation mode of the disclosure and not intended to limit the scope of protection of the disclosure. Any variations or replacements apparent to those skilled in the art within the technical scope disclosed by the disclosure shall fall within the scope of protection of the disclosure.

The invention claimed is:

1. A method for information indication, comprising:
   receiving, by a terminal device, a synchronization signal block (SSB) transmitted by a network device; and
   acquiring, by the terminal device, indication information according to frequency domain position information of the SSB, wherein the indication information is used to indicate an attribute of a carrier associated with the SSB, the attribute of the carrier comprises whether the carrier is used by a licensed carrier system or an unlicensed carrier system; and the carrier associated with the SSB comprises a carrier which uses the SSB for transmission and reception of a subsequent signal.

2. The method of claim 1, wherein the acquiring, by the terminal device, indication information according to frequency domain position information of the SSB comprises:
   acquiring, by the terminal device, the indication information according to a position of a synchronization raster where the detected SSB is located.

3. The method of claim 2, wherein,
   the terminal device determines that the carrier associated with the SSB is used by the licensed carrier system in response to detecting that the SSB is located at a position of a first synchronization raster; and
   the terminal device determines that the carrier associated with the SSB is used by the unlicensed carrier system in response to detecting that the SSB is located at a position of a second synchronization raster.

4. The method of claim 3, further comprising:
   determining, by the terminal device, the position of the first synchronization raster based on a first set of formulas; and
   determining, by the terminal device, the position of the second synchronization raster based on a second set of formulas,
   wherein the position of the first synchronization raster determined by the first set of formulas and the position of the second synchronization raster determined by the second set of formulas meet a relationship as follows: the first synchronization raster and the second synchronization raster have synchronization rasters at different positions within an overlapping bandwidth of a first frequency band and a second frequency band, the first frequency band is a licensed spectrum and the second frequency band is an unlicensed spectrum.

5. The method of claim 4, wherein the determining, by the terminal device, the position of the second synchronization raster based on the second set of formulas comprises:
   in response to that the second frequency band is between 0 and 2650 MHz, determining the position of the second synchronization raster based on a formula N×900 kHz+M×5 kHz+O1, N=1:[2944], M=−1:1;
   in response to that the second frequency band is between 2400 and 24250 MHz, determining the position of the second synchronization raster based on a formula 2400 MHz+N×1.44 MHz+O2, N=0:[15173]; and in response to that the second frequency band is between 24250 and 100000 MHz, determining the position of the second synchronization raster based on a formula [24250.08] MHz+N×[17.28]MHz+O3, N=0:[4383], wherein O1, O2, and O3 denote synchronization raster offsets.

6. The method of claim 5, wherein the determining, by the terminal device, the position of the first synchronization raster based on the first set of formulas comprises:

in response to that the first frequency band is between 0 and 2650 MHz, determining the position of the first synchronization raster based on a formula N×900 kHz+M×5 kHz, N=1:[2944], M=−1:1;

in response to that the first frequency band is between 2400 and 24250 MHz, determining the position of the first synchronization raster based on a formula 2400 MHz+N×1.44 MHz, N=0:[15173]; and in response to that the first frequency band is between 24250 and 100000 MHz, determining the position of the first synchronization raster based on a formula [24250.08]MHz+N×[17.28]MHz, N=0:[4383].

7. A method for information indication, comprising:

transmitting, by a network device, a synchronization signal block (SSB) to a terminal device, wherein the terminal device acquires indication information according to frequency domain position information of the SSB, the indication information is used to indicate an attribute of a carrier associated with the SSB, the attribute of the carrier comprises whether the carrier is used by a licensed carrier system or an unlicensed carrier system; and the carrier associated with the SSB comprises a carrier which uses the SSB for transmission and reception of a subsequent signal.

8. The method of claim 7, wherein the transmitting, by the network device, the SSB to the terminal device comprises:

transmitting, by the network device, an SSB to the terminal device in a position of a first synchronization raster, wherein the terminal device detects that the SSB is located in the position of the first synchronization raster to determine that the carrier associated with the SSB is used by the licensed carrier system; or transmitting, by the network device, an SSB to the terminal device in a position of a second synchronization raster, wherein the terminal device detects that the SSB is located in the position of the second synchronization raster to determine that the carrier associated with the SSB is used by the unlicensed carrier system.

9. The method of claim 8, further comprising:

determining, by the network device, the position of the first synchronization raster based on a first set of formulas; and determining, by the network device, the position of the second synchronization raster based on a second set of formulas;

wherein the position of the first synchronization raster determined by the first set of formulas and the position of the second synchronization raster determined by the second set of formulas meet a relationship as follows: the first synchronization raster and the second synchronization rasters have synchronization rasters at different positions within an overlapping bandwidth of a first frequency band and a second frequency band, the first frequency band is a licensed spectrum and the second frequency band is an unlicensed spectrum.

10. The method of claim 9, wherein the determining, by the network device, the position of the second synchronization raster based on a second set of formulas comprises:

in response to that the second frequency band is between 0 and 2650 MHz, determining the position of the second synchronization raster based on a formula N×900 kHz+M×5 kHz+O1, N=1:[2944], M=−1:1;

in response to that the second frequency band is between 2400 and 24250 MHz, determining the position of the second synchronization raster based on a formula 2400 MHz+N×1.44 MHz+O2, N=0:[15173]; and in response to that the second frequency band is between 24250 and 100000 MHz, determining the position of the second synchronization raster based on a formula [24250.08]MHz+N×[17.28]MHz+O3, N=0:[4383], wherein O1, O2, and O3 denote synchronization raster offsets.

11. The method of claim 10, wherein the determining, by the network device, the position of the first synchronization raster based on a first set of formulas comprises:

in response to that the first frequency band is between 0 and 2650 MHz, determining the position of the first synchronization raster based on a formula N×900 kHz+M×5 kHz, N=1:[2944], M=−1:1;

in response to that the first frequency band is between 2400 and 24250 MHz, determining the position of the first synchronization raster based on a formula 2400 MHz+N×1.44 MHz, N=0:[15173]; and in response to that the first frequency band is between 24250 and 100000 MHz, determining the position of the first synchronization raster based on a formula [24250.08]MHz+N×[17.28]MHz, N=0:[4383].

12. A device for information indication, comprising:

a processor;

a memory configured to store a software program and module executed by the processor; and a transmission device, wherein the transmission device is configured to receive a synchronization signal block (SSB) transmitted by a network device; and the processor is configured to execute the software program and module stored in the memory to acquire indication information according to frequency domain position information of the SSB, wherein the indication information is used to indicate an attribute of a carrier associated with the SSB, the attribute of the carrier comprises whether the carrier is used by a licensed carrier system or an unlicensed carrier system; and the carrier associated with the SSB comprises a carrier which uses the SSB for transmission and reception of a subsequent signal.

13. The device of claim 12, wherein the processor is further configured to execute the software program and module stored in the memory to acquire the indication information according to a position of a synchronization raster where the detected SSB is located.

14. The device of claim 13, wherein the processor is further configured to execute the software program and module stored in the memory to:

determine that the carrier associated with the SSB is used by the licensed carrier system in response to detecting that the SSB is located at a position of a first synchronization raster;

determine that the carrier associated with the SSB is used by the unlicensed carrier system in response to detecting that the SSB is located at a position of a second synchronization raster.

15. The device of claim 14, wherein the processor is further configured to execute the software program and module stored in the memory to:
- determine the position of the first synchronization raster based on a first set of formulas;
- determine the position of the second synchronization raster based on a second set of formulas;
- wherein the position of the first synchronization raster determined by the first set of formulas and the position of the second synchronization raster determined by the second set of formulas meet a relationship as follows: the first synchronization raster and the second synchronization raster have synchronization rasters at different positions within an overlapping bandwidth of a first frequency band and a second frequency band, the first frequency band is a licensed spectrum and the second frequency band is an unlicensed spectrum.

16. The device of claim 15, wherein the processor is further configured to execute the software program and module stored in the memory to:
- in response to that the second frequency band is between 0 and 2650 MHz, determine the position of the second synchronization raster based on a formula N×900 kHz+ M×5 kHz+O1, N=1:[2944], M=−1:1;
- in response to that the second frequency band is between 2400 and 24250 MHz, determine the position of the second synchronization raster based on a formula 2400 MHz+N×1.44 MHz+O2, N=0:[15173]; and
- in response to that the second frequency band is between 24250 and 100000 MHz, determine the position of the second synchronization raster based on a formula [24250.08]MHz+N×[17.28]MHz+O3, N=0:[4383],
- wherein O1, O2, and O3 denote synchronization raster offsets.

17. The device of claim 16, wherein the processor is further configured to execute the software program and module stored in the memory to:
- in response to that the first frequency band is between 0 and 2650 MHz, determine the position of the first synchronization raster based on a formula N×900 kHz+ M×5 kHz, N=1:[2944], M=−1:1;
- in response to that the first frequency band is between 2400 and 24250 MHz, determine the position of the first synchronization raster based on a formula 2400 MHz+N×1.44 MHz, N=0:[15173]; and
- in response to that the first frequency band is between 24250 and 100000 MHz, determine the position of the first synchronization raster based on a formula [24250.08]MHz+N×[17.28]MHz, N=0:[4383].

* * * * *